（12） United States Patent
Yuji et al.

(10) Patent No.: US 8,070,573 B2
(45) Date of Patent: Dec. 6, 2011

(54) VIDEO GAME APPARATUS AND VIDEO GAME PROGRAM

(75) Inventors: Kenichiro Yuji, Tokyo (JP); Fumiaki Shiraishi, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 515 days.

(21) Appl. No.: 12/248,369

(22) Filed: Oct. 9, 2008

(65) Prior Publication Data

US 2009/0098919 A1   Apr. 16, 2009

(30) Foreign Application Priority Data

Oct. 10, 2007 (JP) ................................. 2007-264778

(51) Int. Cl.
*G06F 17/00* (2006.01)
(52) U.S. Cl. ............................................................ 463/9
(58) Field of Classification Search .................. 463/7–9, 463/31, 43
See application file for complete search history.

(56) References Cited

U.S. PATENT DOCUMENTS

| | | | | |
|---|---|---|---|---|
| 6,547,665 B2 * | 4/2003 | Kubo et al. | ...................... | 463/43 |
| 6,666,764 B1 * | 12/2003 | Kudo | ................................ | 463/8 |
| 6,860,807 B2 * | 3/2005 | Tsuchida | ........................... | 463/7 |
| 2001/0053716 A1 * | 12/2001 | Kubo et al. | ...................... | 463/43 |
| 2003/0003978 A1 * | 1/2003 | Tsuchida | ........................... | 463/7 |
| 2003/0013508 A1 * | 1/2003 | Sato | ................................ | 463/8 |
| 2004/0143852 A1 | 7/2004 | Meyers | | |
| 2007/0026944 A1 * | 2/2007 | Maehiro et al. | ................. | 463/31 |

FOREIGN PATENT DOCUMENTS

| | | | |
|---|---|---|---|
| EP | 1779907 A | | 5/2007 |
| JP | 2005 034276 A | | 2/2005 |
| WO | WO 2007/058996 A | | 5/2007 |

OTHER PUBLICATIONS

European Search Report for Application No. EP08166325 completed Dec. 3, 2008 (Munich).
Westwood Studios: "Command & Conquer: Red Alert 2"; (Published Oct. 21, 2000); Electronic Arts, XP002506465, pp. 16-23.
Japanese Wikipedia "Minna de Quest" (English Translation of relevant portion of citation included), Jan. 9, 2009.

* cited by examiner

*Primary Examiner* — Ronald Laneau
(74) *Attorney, Agent, or Firm* — Duane Morris LLP (57) ABSTRACT

A video game apparatus has a memory for storing two or more tasks which a player character can get instructed character(s) to execute according to a scenario development of a game, means for displaying tasks at a time when a scenario development of a game reaches a predetermined position so as to be selected by the player, means for determining candidate characters which can participate the task selected by the player and for displaying these so as to be selectable by the player, means for determining the character selected by the player as participant character, and means for executing the task according to a parameter which is set on the participant character on the basis of the participant character and the selected task.

5 Claims, 5 Drawing Sheets

FIG. 2A

| CHAR-ACTER ID | HP | MAXIMUM HP | EXPERIENCE VALUE | LEVEL | EQUIPPED WEAPON | BASIC ATTACK FORCE | PRESENT ATTACK FORCE | EQUIPPED ARMOR | BASIC DEFENCE FORCE | PRESENT DEFENCE FORCE | ... |
|---|---|---|---|---|---|---|---|---|---|---|---|
| A | | | | | | | | | | | |
| B | | | | | | | | | | | |
| C | | | | | | | | | | | |
| ... | | | | | | | | | | | |

FIG. 2B

| EQUIPMENT 1 | EQUIPMENT 2 | ...... | EQUIPMENT n |
|---|---|---|---|

FIG. 2C

| SHOP ID | OPENING CONDITION | OPENING FLAG | DEALING EQUIPMENT | ... |
|---|---|---|---|---|
| a | | | | |
| b | | | | |
| c | | | | |

VIDEO GAME APPARATUS AND VIDEO GAME PROGRAM

CROSS REFERENCE TO RELATED APPLICATION

The present disclosure relates to subject matter contained in Japanese Patent Application No. 2007-264778, filed on Oct. 10, 2007, the disclosure of which is expressly incorporated herein by reference in its entirety.

BACKGROUND OF THE INVENTION

1. Technical Field

The invention relates to a video game apparatus and video game program, for getting two or more instructed characters to take actions according to a task instructed by selection of a player and advancing the game, depending on results of the actions taken by each character of the two or more instructed characters.

2. Background Art

A role-playing game (RPG) is known as one of the most popular video games. In the RPG, a hero (heroine) in a game world is a player character which is operated by a player, and a game scenario proceeds by solving a task, such as a defeat of an enemy character in a battle. In the RPG, the action of the player character serving as a hero (heroine) is determined by an operation of the player himself (herself), and for this reason, a player is easy to relatively put his (her) feelings into such a game.

In addition to the RPG, a simulation game (SLG) is also known as one of the popular video games. In such a simulation game, the player gives an instruction to each character or a group of characters among two or more characters belonging to one's own party to advance the game. In addition, the best part of the SLG is a dynamic game proceeding since there are many characters to which the player can give an instruction.

In such a situation that respectively different kinds of games become popular, a combination of such games is desired. One of such games formed by combination of the RPG and the SLG is a simulation RPG (SRPG). There is another type of game, an online game wherein procedures for updating are executed in a predetermined time on a server side by selecting next action among two or more selections by each player and a scenario proceeds by executing the selection (See Japanese wikipedia "Minna De Quest" (URL: http://ja.wikipedia.org/wiki/%E3%81%BF%E3%82%93%E3%81%AAde%E3%82%AF%E3%82%8%E3%82%B9%E3%83% 88) (Reference 1).

DISCLOSURE OF INVENTION

Problems to be Solved by Invention

However, in a game of the reference 1, each player can give instruction to one player character only. Therefore, in such a game, the best part of giving instructions to many characters by the player as the original SLG is not actualized. On the other hand, in many SRPGs, the player separately gives instructions to two or more characters. In such a case, a longer time is necessary for instructions. In addition, the game proceeds in such a state the player does not completely get into a hero (heroin) and for this reason, it is not easy to put the player's feelings into the game.

In other words, if the player wishes to direct many characters in such a conventional game apparatus, it is necessary for a player to input a command for each character to be directed every each character, and a longer time is spent for an input operation through input means. In order to input the commands, in advance of the input of the commands, the player thinks which task is to be instructed to the character. Then, after the task to be executed has been determined, the player selects the character which should execute the task in his (her) head, taking character information, such as a personality of each character, level of strength, equipment and experiment value, into consideration, and thereafter selects one or more participant character(s) which should execute the task among many characters through an operation of input means. Subsequently, a concrete command is inputted for each of one or more participant characters selected every each character through an operation of the input means. That is, it is necessary to execute the above-mentioned operation which needs a very long time.

SUMMARY OF THE INVENTION

An object of the invention is to actualize the video game wherein a player can direct many characters without taking a longer time for designation of an action of a character so as to advance the game and the player can easily put his (her) feelings into the game.

Another object of the invention is to provide a video game apparatus and video game program which do not almost need an operation of selecting the characters in view of character information before inputting a command and an operation of inputting a command when the player directs many characters.

According to a first aspect of the invention, there is provided a video game apparatus for advancing a game in a virtual space where a player character which acts according to an operation by a player and two or more instructed characters which act according to a task instructed from the player character exist, respectively different parameters being set on the instructed characters, said game being advanced according to a result of an action of each of the instructed characters. The apparatus includes a memory that stores two or more tasks which the player character can get the instructed character to execute according to a scenario development of the game. The apparatus further includes a task display system that displays, at a time when the scenario development of the game reaches a predetermined position, the tasks to be displayed at the time on a display from said memory so as to be selected by the player. The apparatus further includes a candidate character selection display system that determines candidate characters from the instructed characters, the candidate character being possible to participate in the task selected among the displayed tasks by the player through input means and displays the determined candidate characters on the display so as to be selected by the player. The apparatus further includes a participant character determining system that determines the character selected by the player through the input means from the candidate characters as a participant character, which executes the selected subject. The apparatus further includes a task execution system that executes the task according to the parameter which is set on the participant character on the basis of the determined participant character and the selected task.

In the above-mentioned video game apparatus, the operation to be executed by the player for advancing the game is to select the action of the player character. The action of the player character includes an instruction of the task to be accomplished for advancing the game. If the player selects the task to be instructed, the candidate characters which can participate in the selected task are selected from the instructed characters, and these candidate characters are displayed. The task is executed by the task execution means if only the player selects the participant character which should execute task selected by himself (herself) among the displayed candidate characters.

The player can thus advance the game in such a manner the player only selects the task to be executed and only selects the participant character which should execute the task among the candidate characters corresponding to the selected task, and the operation which is necessary is only the selection of the task and the participant character by the player character. For this reason, when directing many characters (the instructed characters in this case) in order to advance the game, it is almost unnecessary to select the character in view of the character information or to input a command.

Besides, respectively different parameters are set on the instructed characters, and each of the instructed characters takes actions according to one's own parameter in executing the selected task. Therefore, the result depends on which instructed character of two or more instructed characters should take an action as the participant character. Then, the game does not become dull even if the selection of the participant character by the operation of the player is only selection of the task and the participant character.

In the above-mentioned video game apparatus, only the specific player character takes actions according to the operation of the player, and the characters which act according to the operation of the player are not switched in orders when advancing the game. For this reason, the player can completely get into a specific character (the player character in this case) in the game world and can easily put his (her) feelings into the game.

According to another aspect of the invention, the video game apparatus may further include a candidate character file for fixedly storing the characters which can participate in the tasks in association with each of the tasks by selecting the characters among the instructed characters in advance as the candidate characters. In the apparatus, said candidate character selection displaying system may determine the candidate characters by referring to said candidate character file.

Since the candidate characters are selected in advance and fixedly stored, it is not necessary for the player to execute a troublesome operation, such as selection and determination of the character which should execute the task in view of the character information, and it is possible for the player to determine the character which should execute the task in a short time.

According to another aspect of the present invention, the video game apparatus may further include a task information table for storing conditions required for the candidate characters which can participate in the task as character conditions in association with each of the tasks. In the apparatus, said candidate character selection displaying system may determine the candidate characters among the instructed characters on the basis of the character condition corresponding to the selected task stored in the task information table.

The candidate characters can be computed and selected on the basis of the character conditions, so that it is not necessary for the player to consider the conditions of each character in various ways in selection of the participant character, and it is possible to select the proper candidate characters not through the player, and the selection and input of the participant character by the player can be greatly simplified.

According to another aspect of the present invention, the video game apparatus may further include a character condition setting system that sets the character condition in the task information table by the player through the input means.

Since the player can set arbitrary character conditions, it is possible for the player to select the candidate characters, incorporating personal tastes of the player, and it is possible to provide an enjoyable game apparatus to the player having some degree of experiences.

DESCRIPTION OF THE PREFERRED EMBODIMENTS

An embodiment of the invention is now explained, referring to appended figures.

Figure 1:
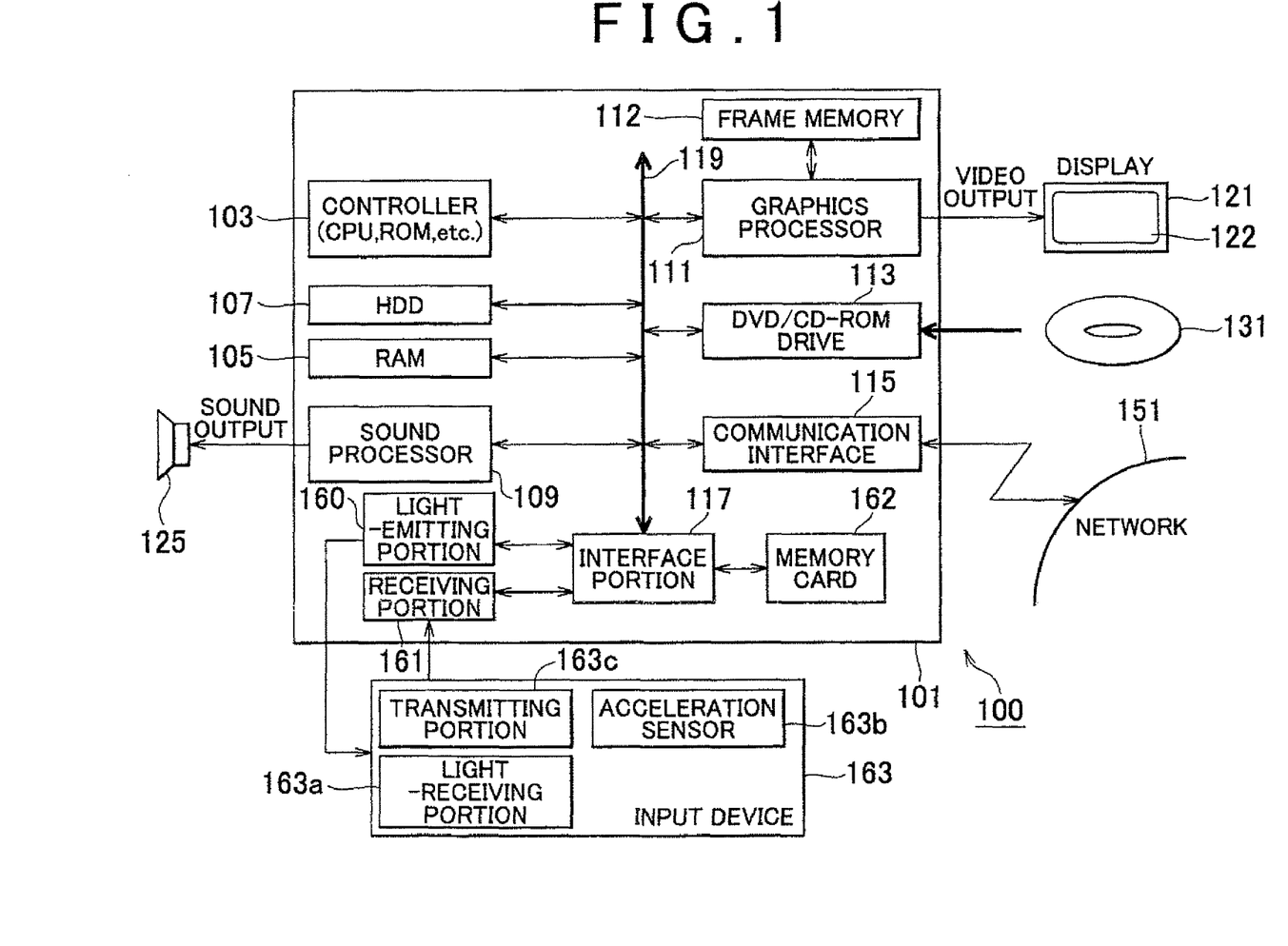
FIG. 1 is a block diagram which shows a structure of a video game apparatus to which an embodiment of the invention is applied.

FIG. 1 is a block diagram which shows a structure of a video game apparatus to which this embodiment is applied. As shown in the figure, a video game apparatus 100 is structured with an apparatus main body 101 as its center. The apparatus main body 101 includes a controller 103, a RAM (Random Access Memory) 105, a hard disc drive (HDD) 107, a sound processor 109, a graphics processor 111, a DVD/CD-ROM drive 113, a communication interface 115 and an interface portion 117 which are reciprocally connected with each other via an internal bus 119.

The sound processor 109 of the apparatus main body 101 is connected with a sound output unit 125 which is a speaker, and the graphics processor 111 is connected with a display 121 with a display screen 122. A storage medium (DVD-ROM or CD-ROM in this embodiment) 131 can be installed on the DVD/CD-ROM drive 113. The communication interface 115 is connected with a network 151. A light-emitting portion 160, a receiving portion 161 and a memory card 162 are connected with the interface portion 117.

The controller 103 includes a CPU (Central Processing Unit), ROM (Read Only Memory) and the like, and executes program stored in the HDD 107 or the storage medium 131, and control the apparatus main body 101. The controller 103 has an internal timer. The RAM 105 is a work area of the controller 103, and temporarily stores information described hereinafter, such as positions of a player character, positions of viewpoints or directions of visual axis of a virtual camera, size of camera collision and vertex coordinates of respective polygons after perspective conversion in the RAM 105. The HDD 107 is a storage area for storing programs and data. The sound processor 109 interprets an instruction of output of sound by a program which is executed by the controller 103, and outputs sound signals to the sound output device 125.

The graphics processor 111 develops image data in a frame memory 112 (which is shown outside the graphics processor 111 in the figure, but is provided in RAM included in a chip constituting the graphics processor 111) according to an image drawing instruction outputted from the controller 103, and outputs video signals for displaying images on the display screen 122 of the display 121. One frame time of an image included in the video signal outputted from the graphics processor 111 is 1/60 second, for instance. Two sets of frame memories are provided, one is for writing and the other is for reading, and both are switched every frame period.

The graphics processor 111 produces image data of a two-dimensional image by applying perspective conversion to objects (player character, non-player character, and objects other than characters) which exist in a three-dimensional virtual space with a virtual camera, and writes the produced data in frame memory 112. The direction of the visual axis of the virtual camera is always oriented to the player character (in detail, a standard point which is set on almost center of gravity of the player character). In other words, the player character always serves as a subject at the time of perspective conversion.

The DVD/CD-ROM drive 113 reads programs and data for the storage medium 131. The communication interface 115 is connected with the network 151 in order to communicate with the other computers. The light-emitting portion 160 includes two or more LEDs which are reciprocally different in radiation direction of lights, and is located at a position having a predetermined relation with the display 121 (upper portion or lower portion of the display 121).

An input device 163 includes a light-receiving portion 163a, an acceleration sensor 163b and a transmitting portion 163c. The light-receiving portion 163a receives lights radiated from each LED which are included in the light-emitting portion 160. Numbers or positions of LEDs lights of which can be received by the light-receiving portion 163a may vary, depending on a direction of the input device 163. The acceleration sensor 163b is a multi-axis acceleration sensor having three or more axes, and detects an inclination and a three-dimensional movement of the input device 163. In addition, the input device 163 has a direction key and two or more operation buttons. Actions of the player character are selected in order through an operation of the direction key by the player, and selection is confirmed by the operation of a specific operation button.

The transmitting portion 163c sends infrared signals according to a situation of the input device 163. In more detail, the transmitting portion 163c sends infrared signals according to a light receiving state of the light-receiving portion 163a, the inclination of the input device 163 which is detected by the acceleration sensor 163b, a moving direction and a moving speed of the input device 163, and input by the direction key and the operation buttons. The infrared signals which are transmitted from the transmitting portion 163c are received by the receiving portion 161 as input data from the input device 163.

The interface portion 117 outputs the input data received from the receiving portion 161 to the RAM 105, and the controller 103 interprets the data and executes arithmetic processing. The interface portion 117 stores data indicating a game proceeding state which is stored in the RAM 105, in the memory card 162 in response to an instruction from the controller 103. The interface portion 117 also reads game data stored in the memory card 162 at the time of interruption and transmits the read data to the RAM 105.

The program and data for playing a game with the video game apparatus 100 are firstly stored in the storage medium 131, for instance. The program and data stored in the storage medium 131 are read out by the DVD/CD-ROM drive 131 at the time of their execution so as to load to the RAM 105. The controller 103 processes the program and the data loaded to the RAM 105, and outputs an image drawing instruction to the graphics processor 111, and outputs an instruction of sound output to the sound processor 109. Intermediate data which exists during the processing by the controller 103 is stored in the RAM 105.

In the video game of this embodiment, a player character and two or more non-player characters exist in a virtual space of the game. The non-player characters includes two or more characters belonging to one's own party which can take actions according to a task to be instructed by the player character and non-player characters other than the characters belonging to one's own party. The non-player characters other than the characters belonging to one's own party include enemy characters which fight against the character belonging to one's own party in case where the instructed task is a battle.

The player operates the input device 163 so as to select an action of the player character, and then, the player character takes an action in accordance with the selection by the player. The player character is a king of a virtual country in a game world, and the action selectable by the player character is to instruct the task so as to get one or more participant character(s) selected from the characters belonging to one's own party to take actions according to the task, and the like. When instructing the task, it may be possible to designate or not designate the character belonging to one's own party which take actions according to the task as the participant character. If the participant character is not designated, any of the characters belonging to one's own party is determined as the participant character which takes actions according to the task by the controller 103 through the game program.

If the task is instructed and the participant character which should take actions is set by the designation of the player or the determination of the video game apparatus 100, the participant character takes actions according to the task which was instructed. The task is a battle with a specific enemy character, for instance. But, the battle between the participant character and the enemy character automatically proceeds as a conventional simulation game.

If the procedure for getting the participant character to take actions according to the task (such as a procedure for battle with the enemy character) is automatically executed, the character may accomplish the task which is instructed as the result of the procedure (that is, a victory of the character belonging to one's own party) in some cases or may not accomplish (defeat of the character belonging to one's own party) in some cases. No matter what the consequences of the accomplishment of the task may be, information showing the results of the actions of the character belonging to one's own party which were taken according to the task is presented to the player, reporting to the player character by the character belonging to one's own party.

If the task has been accomplished and the information is presented to the player, parameters of the participant character are updated as described hereinafter in detail. If the task has not been accomplished and its information is presented to the player, it is possible for the player to designate any proper character(s) belonging to one's own party according to the information and to instruct the same task again. As one of the actions of the player character, the player can select to set a new shop in the game space for selling equipments of the characters belonging to one's own party according to the instructed task (regardless of the results in connection with the accomplishment of the task).

Figure 2A:
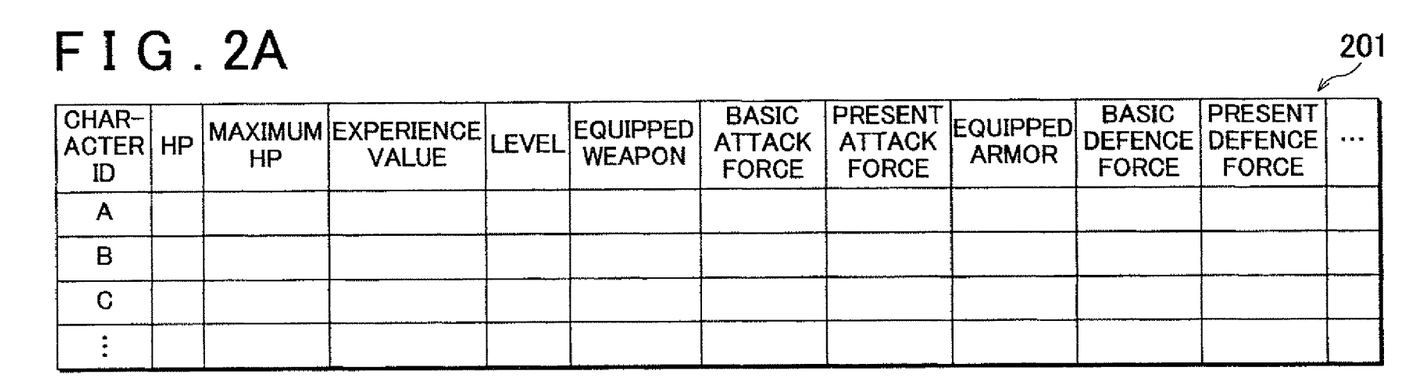
FIG. 2A is a view of a character table to be used in a video game to which the embodiment of the invention is applied.
Figure 2B:
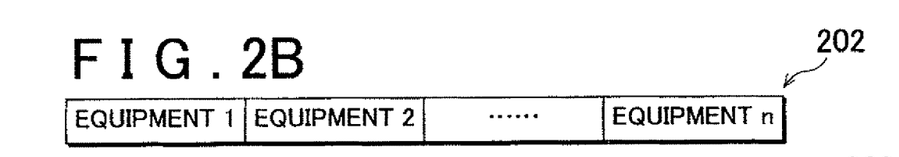
FIG. 2B is a view of a table of owned equipments.
Figure 2C:
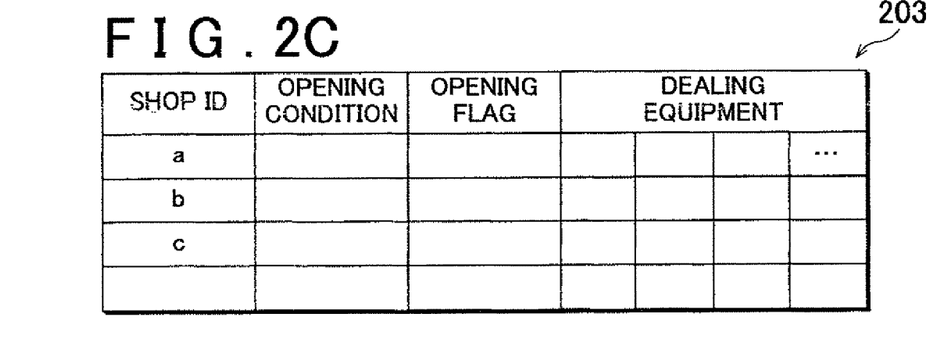
FIG. 2C is a view of an equipment shop table.

Subsequently, data to be used for executing the video game according to this embodiment is now explained. FIGS. 2A to 2C show various kinds of tables which are to be used in the video game in the present embodiment. FIG. 2A shows a character table, FIG. 2B shows an equipment table, and FIG. 2C shows a table relating to a shop for equipments. In addition to these table, information in connection with the instructed task or the accomplished task are stored in the RAM 105 or the HDD 107 as data for the game.

The character table as shown in FIG. 2A is one for storing information relating to the character belonging to one's own party which can take an action according to the task instructed by the player character. As shown in the figure, a character table 201T stores at least character ID, hit point (HP), maximum HP, experience value, level, equipped weapon, basic attack force, present attack force, equipped armor, basic defense force and present defense force for each character belonging to one's own party as character information.

The character ID is information for individually identifying each character belonging to one's own party which can take an action according to the task instructed by the player character. The HP shows a value of HP at the present time of a corresponding character belonging to one's own party, and the maximum HP shows the biggest value which can be presently set as HP. The HP is a parameter which shows so-called physical strength of the character belonging to one's own party. When the HP becomes zero, it is impossible to continue a battle with an enemy to be executed according the instructed task.

The experience value is a parameter of volume of experience of the corresponding character belonging to one's own party in the game, which is numerically shown. The experience value is updated when the character belonging to one's own party accomplishes the task instructed by the player character, and a level is updated whenever experience value reaches a predetermined value. The level is a parameter showing degree of growth of the corresponding character belonging to one's own party in the game, which is numerically shown, and is changed according to values of maximum HP, present attack force, present defense force and level.

The equipped weapon shows a type of weapon which the corresponding character belonging to one's own party is presently equipped with. The equipped weapon of each character belonging to one's own party can be changed by selecting a change of equipment as the action of the player character. The basic attack force is a parameter of basic attack force which the corresponding character belonging to one's own party originally owns. The present attack force is a parameter of attack force which the corresponding character belonging to one's own party presently owns, and is computed by predetermined operation based upon the level and the equipped weapon with respect to the value of basic attack force.

The equipped armor is a type of armors which the corresponding character belonging to one's own party is presently equipped with. The equipped armor of each character belonging to one's own party can be also changed by selecting a change of the equipment as the action of the player character. The basic defense force is a parameter of basic defense force which the corresponding character belonging to one's own party originally owns. The present defense force is a parameter of defense force which the corresponding character belonging to one's own party presently owns, and is computed by predetermined operation based upon the level and the equipped armor with respect to the value of basic defense force.

For each enemy character, a table storing enemy character information, such as at least character ID, HP, present attack force and present defense force (not shown) is prepared. In a battle with the enemy character to be executed according to the task instructed by the player character, a value of damage which can be given to the enemy character by the attack from the character belonging to one's own party is computed based upon the present attack force of the character belonging to one's own party and the defense force of the enemy character, and a value of damage which can be given to the character belonging to one's own party by the attack from enemy character is computed based upon the attack force of the enemy character and the present defense force of the character belonging to one's own party.

An equipment table 202 as shown in FIG. 2B is owned by the player character, and stores equipments (weapons or armors) with which each character belonging to one's own party can be equipped. The weapon or armor with which the character belonging to one's own party is presently equipped is not stored in the equipment table 202. If the weapon with which some characters belonging to one's own party has been equipped is changed for instance, the changed weapon is registered in the character table 201 for the character belonging to one's own party and the weapon with which the character belonging to one's own party has been equipped is registered in the equipment table 202.

The equipments with which each character belonging to one's own party can be equipped can be bought at an equipment shop, and the equipments already owned can be sold at the equipment shop. Amount of money in the game which the player character owns is stored as data (not shown in the figure), and the player character can purchase the equipments in the bounds of the amount of money owned in the game. The player character can obtain the equipments with which each character belonging to one's own party can be equipped when accomplishing a specific task in addition to the purchase at the equipment shop.

An equipment shop table 203 as shown in FIG. 2C is a table for storing information relating to a shop where the player character can purchase the equipments with which the character belonging to one's own party can be equipped. As shown in the figure, at least a shop ID, an opening condition, an opening flag and a dealing equipment are stored in the equipment shop table 203 for each equipment shop.

The shop ID is information for individually identifying each equipment shop. The opening condition is a condition necessary for opening of a corresponding equipment shop, and one of the tasks instructed by the player character is stored therein. The opening flag is set at the time when a corresponding equipment shop is opened by an execution of a procedure according to the task which is set as the opening condition (regardless of the result of task accomplishment). Some of the equipment shops may open from the start of the game, and no opening condition is registered for such equipment shops and the opening flag is set at the start of the game.

The dealing equipment indicates kinds of the equipments which the player character can purchase/sell at a corresponding equipment shop. As the dealing equipments, the weapons or the armors may not individually registered, but may be registered by a group of the armor(s) and/or the weapon(s) which is formed in advance. In such a case, the group of equipments which the player character can purchase/sell at a corresponding equipment shop may be registered. In addition, the dealing equipment may indicate the equipments which the player character can purchase at a corresponding equipment shop, while the equipments may be sold regardless of whether the equipments are registered or not as the dealing equipments.

Figure 3:
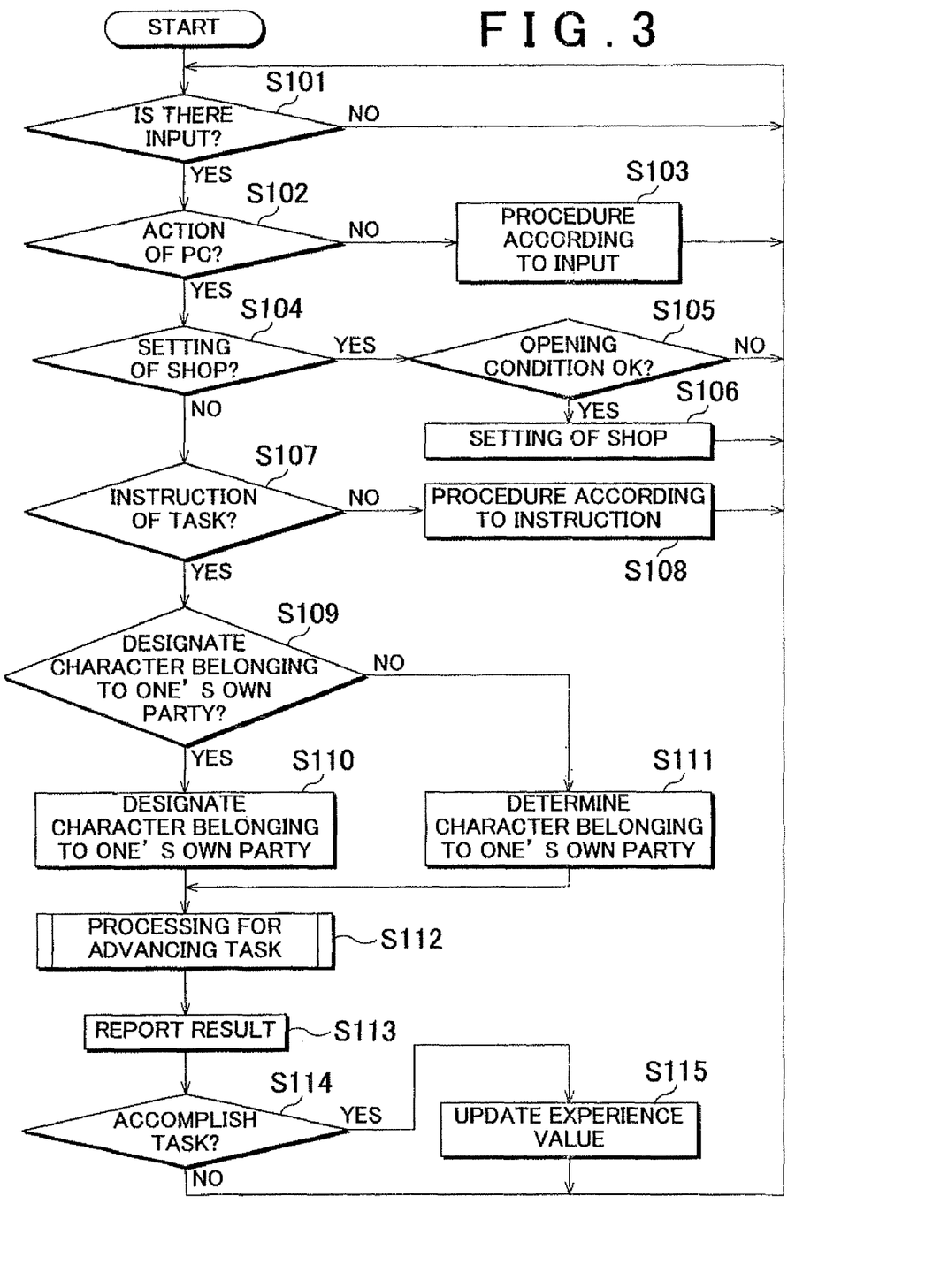
FIG. 3 is a flowchart of procedures for advancing the video game in the embodiment of the invention.

Procedures of the video game in this embodiment are now explained. FIG. 3 is a flowchart showing procedures for the proceeding of the video game in this embodiment. In the video game in this embodiment, procedures for producing game images and displaying the game images as a display screen 122 of the display 121 are included in addition to the procedures as shown in FIG. 3, but such procedures are omitted since the procedures are not directly related to the invention. In addition, the procedures to be executed at start, interruption, and finish of the game are almost the same as ones in a conventional video game, so that such explanation is omitted.

During execution of the video game in this embodiment, the controller 103 judges whether an input signal transmitted from the transmitting portion 163c of the input device 163 is received by the receiving portion 161 (Step S101). The input signal is a infrared signal in accordance with a light receiving state of the light-receiving portion 163a, an inclination of the input device 163 detected by the acceleration sensor 163b, the direction and speed which the input device 163 moves, and input from a direction key and an operation button. If the input signal is not received, the procedure of Step S101 is repeated.

When receiving the input signal, the controller 103 judges whether the received input signal is one for instructing to select an action of the player character (Step S102). If not, the controller 103 executes the procedure according to the input signal (including the procedure for displaying information according to the game proceeding state, such as a state of each character belonging to one's own party) (Step S103). Then, the program returns to the procedure of Step S101.

If the received input signal is one for instructing to select an action of the player character, the controller 103 further judges whether the received input signal is one for instructing to set a new equipment shop (Step S104). If the judgment is that the input signal instructs to set a new equipment shop, the controller 103 judges whether the opening condition of the equipment shop is satisfied (that is, whether the task corresponding to the opening condition has already been instructed), referring to the equipment shop table 203 (Step S105).

If the opening condition of the equipment shop is satisfied, the controller 103 sets the opening flag, and sets the equipment shop in the virtual space of the game so that the player character can purchase/sell the weapons and/or the armors at the equipment shop (StepS106). Thereafter, the program returns to the procedure of Step S101. If the opening condition of the equipment shop is not satisfied, the program returns to Step S101.

If the input signal received in Step S104 is not one for setting a new equipment shop, the controller 103 judges whether further received input signal is one for instructing the task to the character belonging to one's own party (Step S107). If the received input signal is not one for instructing the task, the procedures for getting the player character to take actions according to the input signal (including procedures for purchasing the equipment and changing the equipment of each character belonging to one's own party) are executed (Step S108), and the program returns to Step S101.

If the received input signal is one for instructing the task, the controller 103 judges whether the participant character which should take an action according to the task is designated among the characters belonging to one's own party (Step S109). If the participant character which takes an action according to the task is designated, the controller 103 set the designated character belonging to one's own party as the participant character which takes an action according to the task (Step S110). Then, the program proceeds to Step S112.

If the participant character which takes an action according to the task is not designated, the controller 103 determines the participant character which takes an action according to the instructed task through the game program, and sets the determined character belonging to one's own party as the participant character which takes an action according to the task. In such a case, the participant character may be determined at random, or the character belonging to one's own party having a proper parameter in connection with the instructed task may be selected by execution of AI routine by referring to the character table 201 (Step S111). Then, the program proceeds to Step S112.

In Step S112, the controller 103 executes a procedure for advancing the task instructed to the participant character which is set in Step S100 or S111. This procedure can be done by executing AI routine which is used in a conventional simulation game. However, it is not possible for the player to input an instruction during the progress of the task (Step S112). Further, whether the instructed task has been accomplished is determined according to the result of the procedure of Step S112.

If the procedure of Step S112 finishes, the controller 103 displays the information based upon the result of progress of the task on the display screen 122 as result report in connection with the action of the participant character so as to present the information to the player. If the instructed task is a battle with the enemy character and the task has not been accomplished, reasons why the task has not been accomplished are displayed. If the instructed task has been accomplished, on the contrary, information showing a hint of action preferable as a next action of the player character is displayed (Step S113).

Subsequently, the controller 103 judges whether the task instructed in the procedure in Step S112 has been accomplished (Step S114). If the instructed task has not been accomplished, the program returns to Step S101. If the instructed task has been accomplished, the controller 103 increases a predetermined amount of the experiment value of the participant character which took an action according to the task. When updated experiment value reaches a predetermined value, the controller 103 updates the level of the participant character, and thereby the present attack force and the present defense force are also updated (Step S115). Then, the program returns to Step S101.

If the information based upon the result of the progress of the task is displayed in Step S113, the player can easily select the action of the player character to be next selected by referring to this information. If the player lost at a battle with the enemy character, such information that lost reason is a specific kind of strong attack of the enemy character is reported. On the basis of such information, the player can newly designate a character that is strong against the specific kind of the attack among the characters belonging to one's own party as the participant character and instruct the same task again. Further, if the player thinks there is no character which is likely to win against the enemy character in a present condition among the characters belonging to one's own party, the player can set the equipment shop, and designate the participant character which is equipped with a newly purchased equipment and instruct the same task again.

Alternatively, the task which has not been once accomplished may be instructed after a different task is instructed, and the character belonging to one's own party grows during the progress of accomplishment of the different task (that is, after raising the level of the character by increasing the experiment value). If the task has been accomplished, on the contrary, it is possible to think of opening the equipment shop in preparation for the next task or to think which task is to be instructed for instance, by referring to the information of the player character, such as a hint for a preferable next action.

Figure 4A:
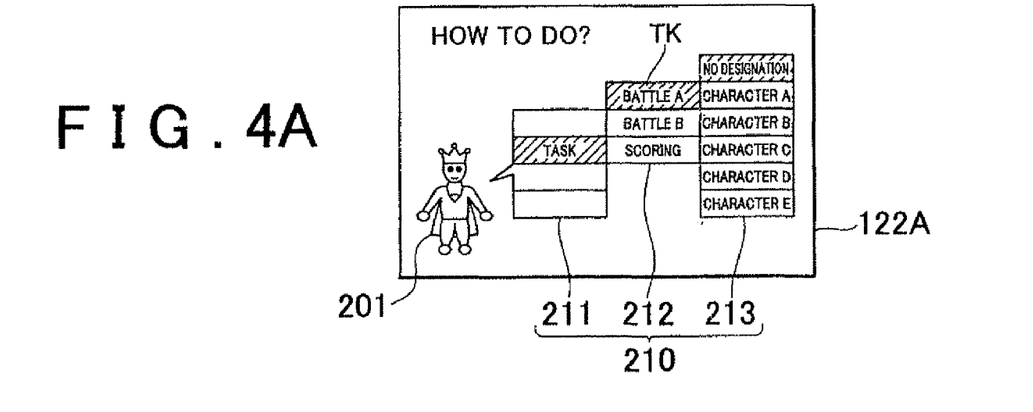
FIG. 4 is a view showing concrete instances of the video game in the embodiment of the invention.
Figure 4B:
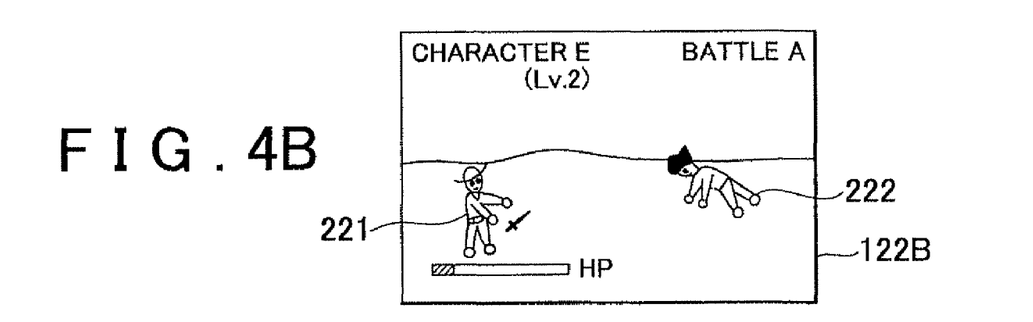
Figure 4C:
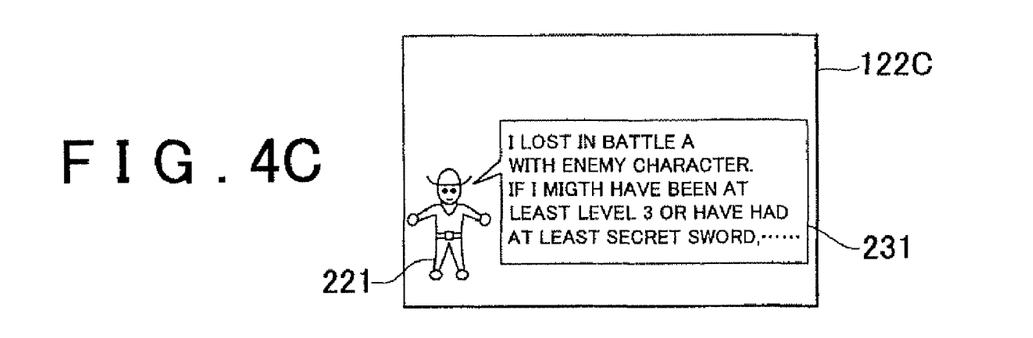

The progress of the video game in this embodiment is now explained by referring to a concrete instance. FIGS. 4A to 4C are views showing the concrete instance of the progress of the video game in this embodiment.

At first, an action selection screen 122A for selecting the action of the player character 201 is displayed on the display 121 as shown in FIG. 4A. On the action selection screen 122A, the player character 201 is displayed, and the action of the player character is selected from a hierarchical menu 210 which is comprised of two or more hierarchies 211 to 213 through an operation of the input device 163 by the player. If the controller 103 judges that a scenario development of the game program reaches a predetermined position, a command "instruction of task" is displayed so as to be selected by the player through the input means in the first hierarchy 211, as shown in FIG. 4 A. As shown in FIG. 4A, tasks TK to be instructed are displayed in the second hierarchy 212. Candidate characters which can participate in the task TK selected by the player in the second hierarchy 212 are displayed on the third hierarchy 213 so as to be selected by the player.

As for the "instruction of task" in the first hierarchy 211, the game program stored in a proper memory stores various kinds of tasks TK which the player character can get the character belonging to one's own party, i.e., the characters to which the task should be instructed, to execute according to the progress of the scenario, as matters to be displayed in the second hierarchy 211 in a form of a task file. For each task TK, a timing of presentation to the player on the action selection screen 122A is determined as timing data in advance, and each task TK owns such timing data as attribute data. Then, the controller 103 can easily determine at which timing in the game scenario the task TK should be displayed in the second hierarchy 212 through the game program by periodically referring to the attribute data of the task TK.

Besides, a memory, such as the RAM 105, stores two or more characters which can participate in the task in association with each task of the second hierarchy 212, which should be displayed in the third hierarchy 213 as candidate characters. The candidate characters, which can participate in the task TK, are stored as matters to be displayed in the third hierarchy 213 of the program. Such the candidate characters may be fixedly set in the program in the form of a candidate character file by selecting them in advance among the characters belonging to one's own party (the characters to which the task should be instructed), that is, by selecting them in advance at the time of preparation of the game program. Alternatively, according to the program, the controller 103 may compute and determine the candidate characters which can participate in the task among the characters belonging to one's own party on the basis of participating conditions for each task which are determined in the program in advance when the player selects the task. The participating conditions may include various kinds of individual character conditions, such as the level, the equipment and the HP of the character. Anyway, the controller 103 determines the candidate characters to be displayed in the third hierarchy 213 on the display 121 by referring to the candidate character file or the result which the controller 103 computes, and displays the candidate characters on the display 121 so as to be selected through the input device 163 by the player. In such a state, the player selects one or more characters which the player wishes to get to execute the task selected by himself (herself) among the displayed candidate characters through the input device 163, and by doing so, the controller 103 can determine the selected character(s) as the participant character(s) which should execute the task.

Figure 5A:
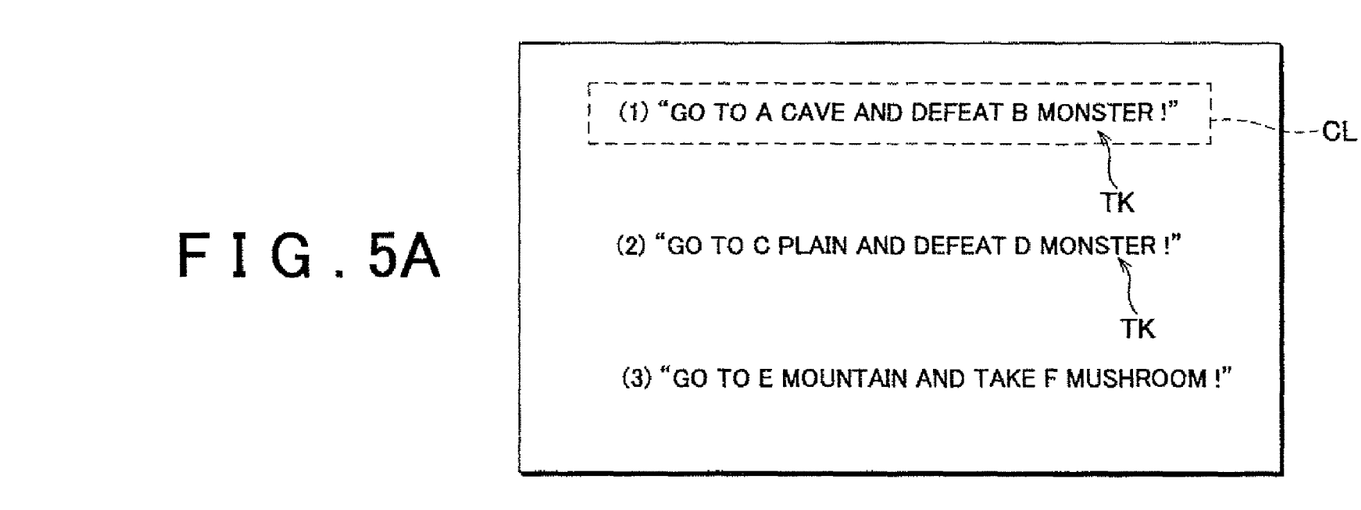
FIG. 5A is view of a concrete task.

As shown in FIG. 5A, the tasks of the second hierarchy are displayed on the display 121 so as to be selected by the player as concrete commands, such as (1) "go to A cave and defeat B monster", (2) "go to C plain and defeat D monster", (3) "go to E mountain and take F mushroom". Thus, it is not necessary for the player to think any command by himself or herself and possible for the player to finish the input by selecting the displayed command with a cursor CL.

As described before, two or more tasks (commands) of the second hierarchy 212 are set in the game program to correspond with the development of the scenario. When the player advances the scenario and the controller 103 determines through the game program that the scenario reaches a predetermined task execution position (timing), the task corresponding to the task execution position (timing) is read out of the game program and is displayed on the display 121. Therefore, it is not necessary for the player to think the task to be executed by himself (herself) and an operation of inputting the task can be executed in a short time.

Besides, when the task (command) to be executed is selected, the character(s) which can execute the task are determined in advance by the game program as the candidate character(s) for each command, or the controller 103 automatically determines the candidate character(s) through the game program. Accordingly, it is not necessary for the player to think the candidate character(s) which are suitable for the execution of the command and possible for the player to finish the character selection operation and the character input operation only by selecting the character which should execute the command as the participant character among the presented candidate character(s). When the controller 103 and the game program computes and determines the candidate character, the controller 103 reads the conditions of the candidate character which can participate in the task selected by the player, referring to the task information table TBL which is stored in the memory, such as the RAM 105.

Figure 5B:
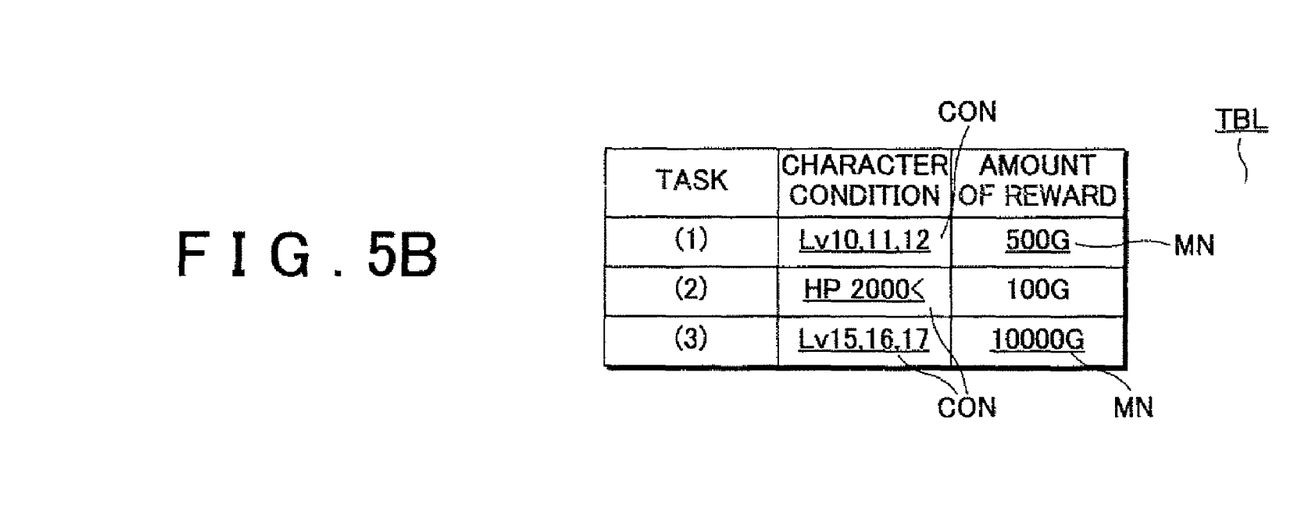
FIG. 5B is a view of a task information table.

As shown in FIG. 5B, the task information table TBL stores the conditions of the character to be selected as the candidate character in association with each task TK as character condition CON and reward to be paid to the participant character at the time of accomplishment of the task TK as reward amount MN in advance as a part of the game program. In case of FIG. 5B, the level of the character is specified as the character condition CON. However, the conditions of the character may be arbitrarily specified. That is, any the character information stored in the character table 201T, such as the experiment value, the character name, the power, and the HP may serve as the character condition CON, or furthermore, the condition may be the character information, such as being acquainted with the player character, an experience of defeating a monster, and the other experiences. In addition, the character information constituting the character conditions CON may be respectively different depending on the tasks, and the character conditions CON may be combination of two or more character information (such as, Lv 10 or more and HP 2000 and more). The controller 103 reads the condition shown in a section of character condition CON which corresponds to the task of task information table TBL selected by the player and selects the character(s) which meet the condition among the characters belonging to one's own party, so that it is possible to determine the candidate character(s) which can participate in the task selected by the player. The candidate character(s) thus determined is displayed on the third hierarchy 213 of FIG. 4A so as to be selected by the player.

The character condition CON and the reward amount MN for each task which are shown in the task information table TBL may be determined by the game program in advance, or the player may input both CON and MN through the input means. In such a case, the controller 103 selects two or more candidate characters among all characters belonging to one's own party in the game on the basis of the character condition CON inputted by the player.

If the action of the player character is selected, the procedure is executed according to the selected action. If the action of the player character 201 is selected with "instruction of task→battle A→no designation" as shown in FIG. 4A, the procedure of the battle A which is the selected task is executed and a scene of the battle is displayed on the display 121 as a battle screen 122B, as shown in FIG. 4B. Since no designation of the character belonging to one's own party is selected in the action selection screen 122A, character E (level 2) 221 which was automatically determined by the controller 103 through the game program among the candidate characters shown in FIG. 4A does a battle with an enemy character 222 on the battle screen 122B of FIG. 4B.

When battle A which is the task instructed by the player character 201 finishes, a result report screen 122C showing the results of battle A is displayed on the display 121 as shown in FIG. 4C. The figure shows a case where character E 221 lost in battle A, and such a report that "I lost in battle A with the enemy character, and if I might have been at least level 3 or have had at least a secret sword, . . . " is shown on a result display window 231 as words of character E 221.

On the basis of the result reported on the result display window 231 of the result report screen 122C as shown in FIG. 4C, the player can win in battle A and accomplish the task if another character belonging to one's own party of which level is 3 or more is designated when instructing battle A as the task again, or if the equipment shop is set so as to purchase a secret sword and the character E 221 is equipped with the secret sword and character E 221 is designated when instructing battle A again as the task.

In the video game of this embodiment, the operation of the input device 163 by the player which is necessary for advancing the game is one for selecting the action of the player character. The actions of the player character include instruction of the task which instructs the character belonging to one's own party to do a battle with the enemy character and to win in such a battle, in addition to a movement in the game space, an opening of the equipment shop, a purchase of the equipment and a change of the equipment with which the character belonging to one's own party is equipped.

If the instruction of the task is designated through the operation of the player as the action of the player character, any character is set among two or more characters belonging to one's own party as the participant character(s) which should take an action according to the task by selecting among the candidate characters by the player, and the selected character(s) takes an action according to the instructed task. There are various kinds of tasks, and each character belonging to one's own party has a different parameter. For these reasons, the task instructed by the player character may not be accomplished.

Even if the task instructed by the player character is not accomplished, information corresponding to the results of the progress of the task is reported to the player as the result report of the action of the character belonging to one's own party. The information which is reported to the player may be the information relating to a defeat reason if the character belonging to one's own party lost at the battle which is given as the task, and may be the information showing a hint of an action preferable as the next action of the player character if the task was accomplished. Then, according to the information reported as the result report of the character belonging to one's own party, it is possible for the player to select a next action of the player character, such as to instruct the same task again, to purchase the equipment or to change the equipment, and to instruct new different task.

In such a way, the player selects the tasks as the action of the player character and instruct the selected tasks in order, and gets an arbitrary character among two or more characters belonging to one's own party to take an action as the participant character by the instructed task so as to advance the game. The operation to be executed by the player for the above processing is only the selection of the action of the player character including the instruction of the task to the character belonging to one's own party. Therefore, the player does not need a longer time for designating the actions of the characters belonging to one's own party when the player character is leading many characters belonging to one's own party so as to advance the game.

The reciprocally different parameters are set on the characters belonging to one's own party in connection with the level, experiment value, attack force and the defense force. The result of the action of the character belonging to one's own party according to the task instructed by the player character (that is, whether or not the task can be accomplished) varies depending on the parameters which are set on the character belonging to one's own party which took an action. Therefore, the game does not become monotonous even if the operation by the player which is necessary for advancing the game is only the selection of the action of the player character including the instruction the task.

In the video game in this embodiment, only the player character serving as a specific character among two or more characters existing in the game space takes actions through the operation by the player. The player does not separately designate the action for the respective characters belonging to one's own party for advancing the game. For this reason, the player can completely get into the specific character (i.e., the player character in this case) in the game world, and easily put his (her) feelings into the game.

The result of the action of the character belonging to one's own party according to the task instructed by the player character (that is, whether not the task can be accomplished) varies depending on the parameters which are set on the characters belonging to one's own party which took actions. The player himself or herself can designate the character belonging to one's own party which should take actions according to the task among two or more candidate characters when instructing the task as the action of the player character. In this way, the player himself or herself can select the character belonging to one's own party which is likely to accomplish the task even if respective characters belonging to one's own party are original non-player characters which do not take actions by a direct operation by the player.

In a case where the same task as one which has not been accomplished once is instructed again, the player should have received information useful for selecting new action for the player character, such as the information why the last task has not been accomplished when the result is that the last task has not been accomplished. For this reason, the player more easily accomplish the task by distinguishing the character belonging to one's own party which is likely to accomplish the task and repeating the same procedures many times when the same task is instructed again, and the game can be more smoothly advanced thereby.

The parameter, such as the experience value, is updated on condition that the character belonging to one's own party which took actions according to the task which was designated by the player character accomplished the task. Then, a specific character can be brought up in the game, differentiating such character from the other characters belonging to one's own party by limiting the participant characters to be designated when instructing the task through the operation by the player to the specific character. When the task has been accomplished, the player character may give the amount of money corresponding to the reward MN to the participant character on the basis of the reward amount MN in the task information table TBL, as shown in FIG. 5B. The amount of money corresponding to the distributed reward MN is accumulated in data indicating the money owned by the corresponding character in the character table 201T as shown in FIG. 2A so that the data can be updated.

On the other hand, some characters belonging to one's own party are suitable for accomplishment of the task and the other characters belonging to one's own party are not suitable at the time of instruction of a task since reciprocally different parameters are set on the respective characters belonging to one's own party. By firstly selecting the instruction of the task as the action of the player character without designating the character belonging to one's own party and subsequently getting the controller 103 to compute and select two or more candidate characters according to the selected task (command), it is possible to smoothly advance the game. In such a case where the task which has not yet been instructed is newly instructed, it is difficult to judge the character belonging to one's own party which is suitable for the instructed task. In such a case, the effects are significant.

The parameter of the character belonging to one's own party which took actions according to the task by designation by the player character is updated on condition that the task was accomplished. Whether or not the parameter is updated influences a result of the action to the next instructed task. The character belonging to one's own party which indirectly takes actions by the instruction of the task from the player character also grows in a process of the game in addition to the player character which directly takes actions by the operation of the player, so that a variation of the game proceeding broadens and funs of the game increases thereby.

Each character belonging to one's own party is equipped with weapons and armors, and the attack force or the defense force varies depending on kinds of equipped weapons or armors. In such a case where the character belonging to one's own party which took actions in response to the instructed task is not equipped with the weapon or the armor having sufficient performance, the character may lose at the battle with the enemy character and may not accomplish the task due to the defeat. In this case, the information showing the reasons why the task has not been accomplished is reported to the player.

The weapon or the armor with which each character belonging to one's own party is equipped can be changed by selecting a corresponding command by the player character in the first hierarchy 211 of the action selection screen 122A in FIG. 4A. Even if the same task as one which has not been accomplished once is instructed again and the same participant character is designated, the task may be accomplished by changing the equipment. Therefore, a characteristic on strategy of the game can be improved by the selection of the weapon or the armor with which each participant character is equipped.

It may be possible to set a new equipment shop as an action of the player character after a predetermined task is instructed and its result is issued (regardless of the result of accomplishment). If the new equipment shop is located, it is possible to purchase the weapon or the armor stronger than one with which each character belonging to one's own party has been equipped by selecting as the action of the player character, and the attack force or the defense force of the character belonging to one's own party which is equipped with newly purchased strong weapon or armor can be improved thereby.

Since the information showing the reasons why the task has not been accomplished is reported to the player, the player can judge whether a stronger weapon or armor is necessary and whether it is necessary to set the new equipment shop in order to accomplish the same task. Then, the task may be accomplished by a stronger equipment even if the same character belonging to one's own party is designated when the same task as one which has not been accomplished once is instructed again, so that the characteristic on strategy of the game can be improved by building of the equipment shop or purchase of the weapon or the armor equipped by each character belonging to one's own party.

The invention can be modified in various kinds of forms or can be applied to various kinds of forms in addition to the above-mentioned embodiment. One of modified forms in the above-mentioned embodiment which can be applied to the invention will be explained.

In the above-mentioned embodiment, the participant character which is set to take actions according to the instructed task executes the task, and the information according to the result is reported to the player as the result report. A state of executing the task by the participant character which was set to take actions according to the instructed task may be displayed on the display 122 as an image so as to present to the player.

Alternatively, such a state may be displayed on all or a part of the display 122 as a digest of the result report. In such a case where the state of advancing the task by the participant character which was set to take actions according to the instructed task is presented to the player later as the result report, such a scene that the player character waits the finish of the procedure according to the task may be inserted into a chain of game images.

In the above-mentioned embodiment, the player selects the action of the player character through the operation of the input device 163. The task(s) is automatically presented to the player by the controller 103 through the game program according to the development of the scenario, and therefore various presentation methods are available. For instance, the player may select the instruction of the task as the action of the player character when the player character walks around a virtual country in the game space in response to the operation of the direction key of the input device 163 and a predetermined event (such as having a conversation between the player character and a predetermined non-player character, or a finding of a predetermined item in the game space) occurs. In addition, the equipment shop may be set (built) when such a predetermined event occurs.

Since the player can select various kinds of actions while the player character walks around the game space and thereby pure RPG taste are improved, the player can project himself (herself) into the player character and can have feelings as if the player lives in a virtual country in the game. In such a case, the player is easy to put his (her) feelings into the game.

In the above-mentioned embodiment, there are two or more candidate characters which can take actions in response to the task instructed by the player character, but more detailed explanation is not in the specification. For instance, the player may select construction of a house in the virtual country as the action of the player character in addition to the installation of the equipment shop. Then, people (non-player characters) may gather together in a case where the house was constructed. All or a part of the non-player characters which thus gathered may be the characters belonging to one's own party which take actions according to the task instructed by the player character. That is, the characters belonging to one's own party may increase according to the proceeding of the game, and the candidate characters may be computed and selected from such characters belonging to one's own party.

In such a case that the player character walks around in the game space according to the operation by the player, the non-player character which gathered due to the construction of a house may ask a permission to become the character belonging to one's own party whenever the non-player character meets the player character, and to become the character belonging to one's own party may be permitted, depending on the action of the player character which is selected by the player. And, the non-player character which gathers due to the construction of a house may provide information useful for the game proceeding excluding one showing the result of the action according to the instructed task (such as information in connection with a hint of the task suitable for the next instruction) whenever the non-player character meets the player character.

In the above-mentioned embodiment, the experiment value of the participant character which took actions in response to the instructed task is increased on condition that the task has been accomplished. Alternatively, the experiment value of the participant character which took actions in response to the instructed task may be increased even if the task has not been accomplished. In this case, increasing volume of the experiment value may be changed depending on the result of the accomplishment of the task. Besides, the experiment value of the character belonging to one's own party which did not take an action in response to the instructed task may be increased on condition that the task was instructed. In this case, increasing volume of the experiment value may be changed depending on whether the character is participant character which took actions in response to the instructed task.

In the above-mentioned embodiment, the player can designate the participant character which takes actions in response to the task among the candidate character(s) in any tasks if the task is instructed in Step S109. Alternatively, there may be a task for which the player can not designate the participant character. In a case where the task for which the player can not designate the participant character is instructed, the participant character which takes actions in response to the task may be determined by the controller 103 through the game program.

In the above-mentioned embodiment, any of the candidate characters is always determined as the participant character which takes actions in response to the task if the player does not designate the participant character in a case where the task is instructed in Step S109. Alternatively, no character may be determined as the participant character which takes actions in response to the task even if the player does not designate the participant character in the case where the task is instructed. In such a case, the program may return to the procedure of Step S101 without executing the procedures of Steps S112 to S115.

Then, it is possible to avoid the procedure for advancing the task (Step S112) in a case where the instructed task is not likely to be accomplished in view of a game proceeding state (for instance, in a case where the instructed task is to do a battle with an extremely strong enemy character and the levels of all participant characters are still extremely low), so that the game can be still more smoothly advanced. In such a case, the participant character which takes actions according to the task instructed by the player himself (herself) may not be designated.

In the above-mentioned embodiment, the player can select to instruct the task as the action of the player character, and the participant character which takes actions according to the task is set whenever the task is instructed and the procedure according to the task is executed. Alternatively, the player may select to simultaneously instruct two or more different tasks as the action of the player character. In a case where two or more different tasks are simultaneously instructed, the participant character which takes actions may be set for each task instructed (by the designation by the player or by determination by the video game apparatus 100 without the designation by the player) and the result of the action may be reported and presented to the player for each instructed task.

Therefore, the variation of the game proceeding increases, and the enjoyment of the game increases thereby. The maximum number of the tasks which can be simultaneously instructed may be increased in order according to the game proceeding. Alternatively, the player may select to simultaneously instruct the task and take the other action as the action of the player character.

In the above-mentioned embodiment, the weapon or the armor equipped by each character belonging to one's own party can be changed by selecting as the action of the player character. Besides, a new weapon or armor can be purchased by selecting as the action of the player character. Alternatively, the equipment or purchase of the weapon or the armor of each character belonging to one's own party may not be determined by the player by the selection of the action of the player character, but may be determined by a determination of each character belonging to one's own party by AI routine or the like.

In the above-mentioned embodiment, the task is instructed by the player character and the result of the action of the participant character according to the task is reported as soon as the action is taken. On the contrary, a virtual date may be set in the game and the result of the action by the participant character according to the task may be reported at the end of every virtual day. In such a case, two or more tasks may be instructed during a single virtual day, and the results of the actions to the respective tasks may be reported in order at the end of the day.

In the above-mentioned embodiment, the video game apparatus 100 which is an apparatus dedicated for a game is applied as an apparatus serving as a platform for executing a video game. Alternatively, a general purpose computer may be used as a platform as long as it has structural elements similar to the video game apparatus 100 and a function of drawing images. A portable game apparatus having such a structure that the display 121 and the sound output device 125 are stored in the housing of the apparatus main body 101 (including a portable phone having an application execution function) may be applied.

A semiconductor memory card can be applied as the storage medium 131 in place of a DVD-ROM or a CD-ROM. A card slot for inserting such a memory card can be provided in place of the DVD/CD-ROM drive 113. In case of a general purpose computer, the program and the data in connection with the invention may be stored in the HDD 107 in advance without storing in the storage medium 131. An optional storage medium for storing the program and the data in connection with the invention can be used according to a physical form or a commercial activity form of a hardware.

In the above-mentioned embodiment, the program and data of the video game apparatus 100 which are stored in the storage medium 131 are distributed. But, the program and the data may be stored in a fixed disc apparatus on the network 151 which a server apparatus has so as to be transmitted to the apparatus main body 101 through the network 151. In the video game apparatus 100, the program and data received by the communication interface 115 from the server apparatus can be stored in the HDD 107 and can be loaded to the RAM 105 at the time of execution.

The invention claimed is:

1. A video game apparatus for advancing a game in a virtual space where a player character which acts according to an operation by a player and two or more non-player characters exist, respectively different parameters being set on the non-player characters,
the non-player characters being comprised of a group of the non-player characters belonging to the player character's own party and another group of the non-player characters not belonging to the player character's own party;
the player character instructing a task to the non-player characters belonging to the player character's own party and getting at least one participant character, which is selected from the non-player characters belonging to the player character's own party, to execute the instructed task;
the game being advanced according to a result of the task executed by the participant characters the apparatus comprising:
a memory that stores a plurality of the tasks which the player character can get the non-player characters belonging to the player character's own party to execute in association with a scenario development of the game;
a task display system that displays the tasks on a display so as to be selected by the player, when the scenario development of the game reaches a predetermined position, the tasks to be displayed being determined by referring to the memory;
a candidate character selection display system that determines candidate characters from the non-player characters belonging to the player character's own party, the candidate character being possible to participate in the task selected among the displayed tasks by the player through input means and displays the determined candidate characters on the display so as to be selected by the player;
a participant character determining system that determines the character selected by the player through the input means from the candidate characters as the participant character, which executes said selected task; and
a task execution system that executes the task according to the parameter which is set on the participant character on the basis of the determined participant character and the selected task.

2. The video game apparatus according to claim 1, further comprising a candidate character file fixedly storing the characters which can participate in the tasks in association with each of the tasks by selecting the characters among non-player characters belonging to the player character's own party in advance as the candidate characters,
wherein said candidate character selection displaying system determines the candidate characters by referring to said candidate character file.

3. The video game apparatus according to claim 1, further comprising a task information table for storing conditions required for the candidate characters which can participate in the task as character conditions in association with each of the tasks, wherein said candidate character selection displaying system determines the candidate characters among the non-player characters belonging to the player character's own party on the basis of the character condition corresponding to the selected task stored in the task information table.

4. The video game apparatus according to claim 3, further comprising a character condition setting system that sets the character condition in the task information table by the player through the input means.

5. A non-transitory computer-readable media containing a video game program stored thereon for causing a computer including a memory to function as means for advancing a game in a virtual space where a player character which acts according to an operation by a player and two or more non-player characters exist, respectively different parameters being set on the non-player characters,
the non-player characters being comprised of a group of the non-player characters belonging to the player character's own party and another group of the non-player characters not belonging to the player character's own party;
the player character instructing a task to the non-player characters belonging to the player character's own party and getting at least one participant character, which is selected from the non-player characters belonging to the party character's own party to execute the instructed task;
the game being advanced according to a result of the task executed by the participant character, wherein the video game program stores a plurality of the tasks which the player character can get the non-player characters belonging to the party character's own party to execute in association with a scenario development of said game as a task file;
the game program causing the computer to further function as:
a task display system that displays the tasks on a display so as to be selected by the player when the scenario development of the game reaches a predetermined position, the tasks to be displayed being determined by referring to the task file;
a candidate character selection display system that determines candidate characters from the non-player characters belonging to the player character's own party, the candidate character being possible to participate in the task selected among the displayed tasks by the player through input means and displays the determined candidate characters on the display so as to be selectable by the player;
a participant character determining system that determines the character selected by the player through the input means from the candidate characters as a participant character, which executes the selected task; and
a task execution system that executes the task according to the parameter which is set on the participant character on the basis of the determined participant character and the selected task.

* * * * *